(12) United States Patent
Kofler (10) Patent No.: US 9,584,894 B2
(45) Date of Patent: Feb. 28, 2017

(54) ANTENNA SYSTEM OF A RADIO MICROPHONE

(71) Applicant: AKG Acoustics GmbH, Vienna (AT)

(72) Inventor: Heinrich Kofler, Vienna (AT)

(73) Assignee: AKG Acoustics GmbH, Vienna (AT)

( * ) Notice: Subject to any disclaimer, the term of this patent is extended or adjusted under 35 U.S.C. 154(b) by 10 days.

(21) Appl. No.: 14/556,001

(22) Filed: Nov. 28, 2014

(65) Prior Publication Data
US 2015/0156577 A1 Jun. 4, 2015

(30) Foreign Application Priority Data
Nov. 28, 2013 (EP) .................................... 13194893

(51) Int. Cl.
*H04R 1/08* (2006.01)
*H04B 1/18* (2006.01)

(52) U.S. Cl.
CPC *H04R 1/08* (2013.01); *H04B 1/18* (2013.01); *H04R 2420/07* (2013.01); *H04R 2499/11* (2013.01)

(58) Field of Classification Search
CPC ......... H04R 3/00; H04R 1/08; H04R 2499/11; H04R 2420/07; H04R 2410/00; H04B 1/005; H04B 1/18; H04B 1/205; H04B 1/38; H04B 1/3833; H04B 1/3838; H04B 1/40; H04B 2001/0408; G10K 11/00
See application file for complete search history.

(56) References Cited

U.S. PATENT DOCUMENTS

| | | | | |
|---|---|---|---|---|
| 2,626,322 A | * | 1/1953 | Appleman | H03G 3/22 330/131 |
| 3,474,451 A | * | 10/1969 | Abel | G09B 5/12 381/80 |
| 4,050,070 A | * | 9/1977 | Beno | G01S 7/40 342/187 |
| 4,787,686 A | * | 11/1988 | Tajima | H03H 11/245 327/308 |
| 4,967,169 A | | 10/1990 | Sun et al. | |
| 5,140,200 A | * | 8/1992 | Stanton | H03H 7/255 327/308 |

(Continued)

FOREIGN PATENT DOCUMENTS

| | | |
|---|---|---|
| JP | 2007281735 A | 10/2007 |
| JP | 2010252064 A | 11/2010 |

OTHER PUBLICATIONS

European Search Report for corresponding Application. No. 13194893.7, mailed Mar. 28, 2014, 6 pages.

(Continued)

*Primary Examiner* — Thang Tran
(74) *Attorney, Agent, or Firm* — Brooks Kushman P.C.

(57) ABSTRACT

The invention concerns an antenna system of a radio microphone that includes an antenna path starting at an in port and ending at an out port along with an amplifier and a radio frequency (RF) cable. In order to compensate for various cable attenuations, an attenuator is provided in series with a variable slope compensator between the amplifier and the RF cable. In order to avoid a negative effect on a large signal behavior of variable slope compensators, field effect transistors (FETs) or pin diodes are used for switching of the resistances so that a large signal behavior is achieved.

14 Claims, 8 Drawing Sheets

(56) References Cited

U.S. PATENT DOCUMENTS

| | | | |
|---|---|---|---|
| 5,144,267 A | 9/1992 | West, Jr. | |
| 6,028,946 A * | 2/2000 | Jahne | H04R 3/00 |
| | | | 381/111 |
| 6,218,909 B1 * | 4/2001 | Eban | H03B 5/1847 |
| | | | 331/117 R |

OTHER PUBLICATIONS

Extended European Search Report for Application No. 14193005.7, mailed May 20, 2015, 6 pages.

* cited by examiner

ANTENNA SYSTEM OF A RADIO MICROPHONE

CROSS-REFERENCE TO RELATED APPLICATIONS

This application claims priority to EP Application No. 13 194 893.7, filed Nov. 28, 2013, the disclosure of which is incorporated in its entirety by reference herein.

TECHNICAL FIELD

The invention concerns radio microphones and especially their antenna systems according to an antenna system of a radio microphone and slope compensation in relation to telecable and satellite technology.

BACKGROUND

Different cable attenuation occurs in antenna systems of radio microphones. This must be considered, in which case amplification control in the antenna is required to compensate cable attenuation by means of active components in order to maintain the optimal possible combination of intercept and noise factor. Since the cables in antenna systems have frequency-dependent attenuation, an optimal combination of intercept and noise factor is only possible at one frequency point in a broadband amplifier, whether it is controllable or constantly amplified. To this it must be added that the slope of frequency-dependent attenuation changes with cable length so that there is an additional parameter to be considered.

This so-called slope compensation plays a role in the field of telecable technology and satellite technology, U.S. Pat. No. 4,967,169 ("the '169 patent") and U.S. Pat. No. 5,144, 267 ("the '267 patent") being referred to in this context. The '267 patent discloses a compensation circuit with controlled resistances, based on a set of diodes. One series tuned circuit provides for varying degrees of negative slope compensation and a parallel tuned circuit provides for varying degrees of positive slope compensation. The network elements are connected in a modified bridge T configuration. These controllable attenuators generally have an adverse effect on the intercept (i.e., large signal behavior).

However, the problem underlying the invention in the field of radio microphones of selecting amplification of the active element so that subsequent cable attenuation is always compensated (i.e., without worsen the intercept) cannot be solved. This problem is again due to the fact that, depending on the type of cable employed and the employed cable length, the cable attenuation is different, for which reason it is always necessary in the prior art to provide non-constant, but variable amplification of the active elements. This occurs, for example, by providing a controllable attenuator in series with a radio frequency ("RF") cable so that the combination of the amplifier, the RF cable and the controllable attenuator is set at 0 dB. It would also be possible to make the gain of the amplifier variable, which, however, generally has an adverse effect on noise factor and/or intercept.

It is naturally a basic requirement that amplification is greater than attenuation of the employed RF cable. The optimization of the ratio or combination of intercept and noise factor just described at one frequency point is therefore possible. This means that a change of 0 dB occurs at this optimal frequency point, whereas at lower frequencies, at which cable attenuation is lower, amplification occurs at the end of the chain and at higher frequencies, at which the cable attenuation is higher, lower amplification occurs, or, when the frequency band center is set at 0 dB, attenuation is actually present for the uppermost frequencies and the noise factor is therefore also increased.

Japanese Patent Publication JP 2007/281735 deals with the problem to prevent interference between adjacent channels by controlling signal attenuation of a desired channel in a system installation. This is achieved by controlling the attenuators in dependency of the output of a high frequency mixing distributor. Again, these controllable attenuators generally have an adverse effect on noise factor and/or intercept.

SUMMARY

It is now the task of the invention to solve the noted problem or at least essentially minimize it so that even during use of the RF cable of different length and/or different quality (i.e., attenuation per length) frequency-independent transmission is achieved, without worsening the intercept, if possible.

An active element whose frequency response is designed opposite the employed cable could be mentioned as being theoretically ideal so that it is clear that this solution only matches one cable, despite the ideal and therefore non-attainable assumption.

The differences at different cable lengths will be taken up briefly below and it is essential in conjunction with the invention that short cables have a lower attenuation difference between the lowermost and uppermost use frequency in the antenna system than a long cable, which means the slope of attenuation over frequency increases with increasing cable length.

These problems are solved according to the invention by a variable slope compensator in series with an attenuator according to the claimed features.

The slope compensator must then take over compensation of the frequency response of the RF cable and the attenuator must take over compensation of the difference between the amplifier and the highest cable attenuation. For compensation of the base attenuation, an amplifier is used, which is always operated at the same operating point at an optimal ratio of noise factor to intercept. The slope compensator is essentially a high pass filter with a variable slope in which fixed resistances are provided. The use of field effect transistors ("FETs") or pin diodes as a variable resistance is, according to the invention, rejected because of the negative effect on a large signal behavior. The FETs or pin diodes are used for switching of the resistances, but only as pure switches without an effect on the signal, so that an excellent large signal behavior is achieved. So-called microelectromechanical systems ("MEMS") switches can also be used. As an unexpected result of this expedient according to the invention, one gains the advantage that this switching can be easily controlled by a microcontroller and the otherwise necessary precise temperature-stable control voltages and consideration of the manufacturing scatter of the FETs or pin diodes are not necessary.

According to the invention, one therefore obtains a slope network consisting of several parts, which achieves the desired slope of attenuation by corresponding switching (i.e., actually: bridging).

In one embodiment, the fact that the attenuator can be digitally controlled (i.e., series circuit of z.B. 1 dB+2 dB+4 dB+8 dB, which are abridged or not, from which a control range of 0-15 dB follows) and the slope is also digitally controlled, is exploited, as described above, in which case the slope and attenuator can be combined with restriction to certain cable types. There is a direct relation between the required attenuation and slope. This relation is constant for selected cable types, as explained further below.

In another embodiment of the invention it is possible to automate the adjustment process of the network.

BRIEF DESCRIPTION OF THE DRAWINGS

The invention is further explained below with reference to the drawing. In the drawing

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
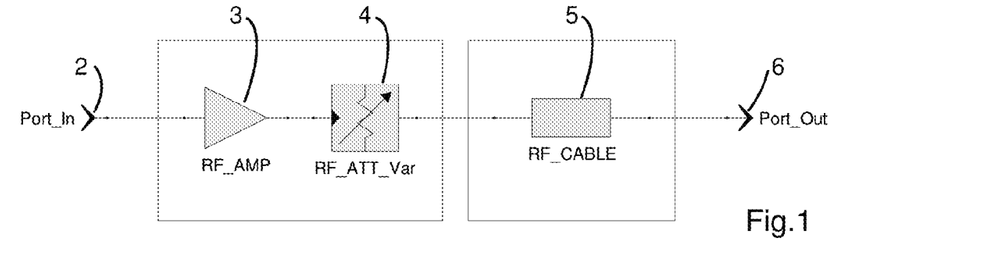
FIG. 1 shows a sketch of an antenna system.

FIG. 1 shows an antenna path 1 from an input, a port at 2, via an active element, an amplifier 3, a controllable attenuator 4 and, in order to make exchangeability clear, a radio frequency ("RF") cable 5 marked in its own box up to an output point, a port out 6.

Figure 2:
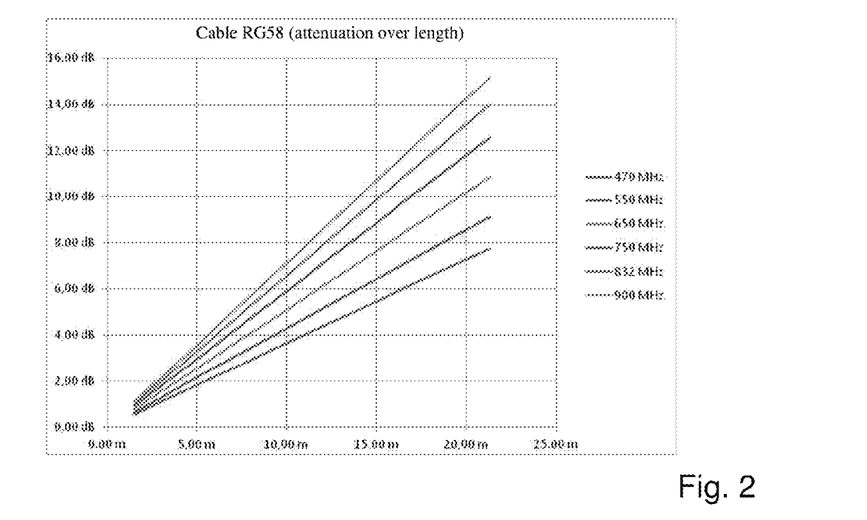
FIG. 2 shows an attenuation of one cable over the length for different frequencies.

FIG. 2 shows an attenuation in dB over different frequencies between 470 MHz and 870 MHz for a selected type of cable but with different length, beginning in a lowermost graph with a length of 1.52 m and ending in an uppermost graph with 21.28 m length. Other relations naturally apply for other cables, although the essential trends are always similar to each other.

Figure 3:
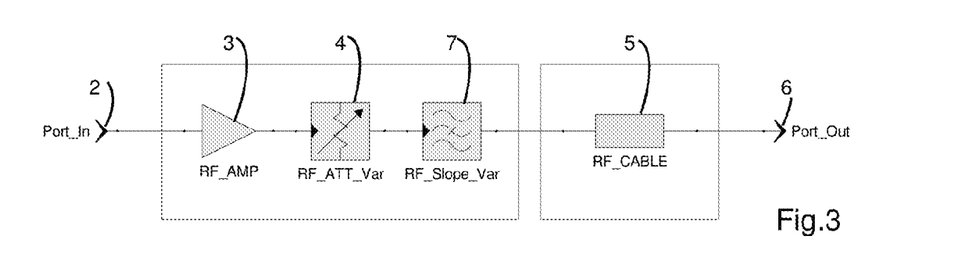
FIG. 3 shows a sketch of the circuit according to the invention.

FIG. 3 shows a solution according to the invention in a view similar to that of FIG. 1, in which the same components are also provided with the same reference numbers, a slope compensator 7 is connected in series after the controllable attenuator 4.

Figure 4:
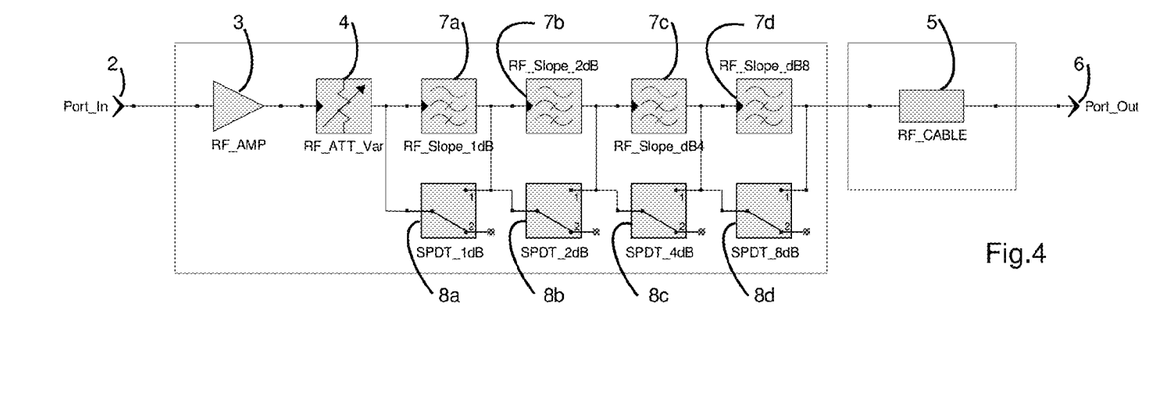
FIG. 4 shows a depiction of the circuit in FIG. 3 but with a detailed depiction of a slope compensator.

FIG. 4 shows in greater detail the manner in which a slope compensator 7 according to the invention is preferably constructed, namely from individual resistances, which are adapted to the employed cable 5 by a corresponding connection. Four slope compensators 7a, 7b, 7c and 7d (or "7") are combined to match via the corresponding switching elements 8a, 8b, 8c and 8d (or "8") via a microcontroller (not shown).

As mentioned above, the attenuator 4 has the task of creating the difference between the amplifier 3 and the highest cable attenuation, whereas the slope compensator or compensators 7 assume the task of compensating for the frequency response of the actual RF cable 5.

Figure 5:
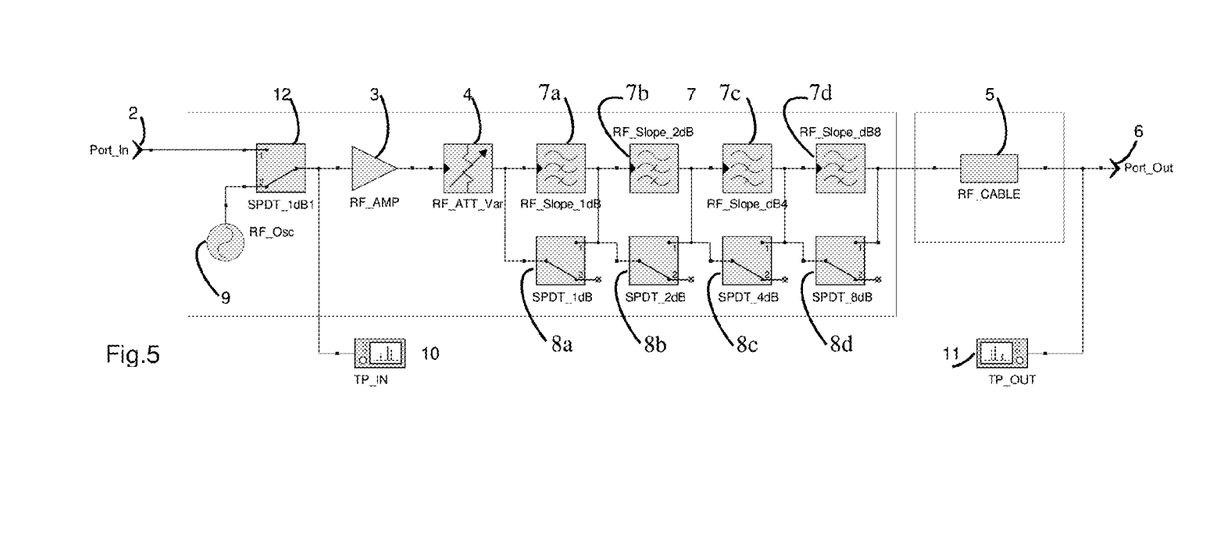
FIG. 5 shows a schematic view of an automatic measurement of the slope compensator.
Figure 6:
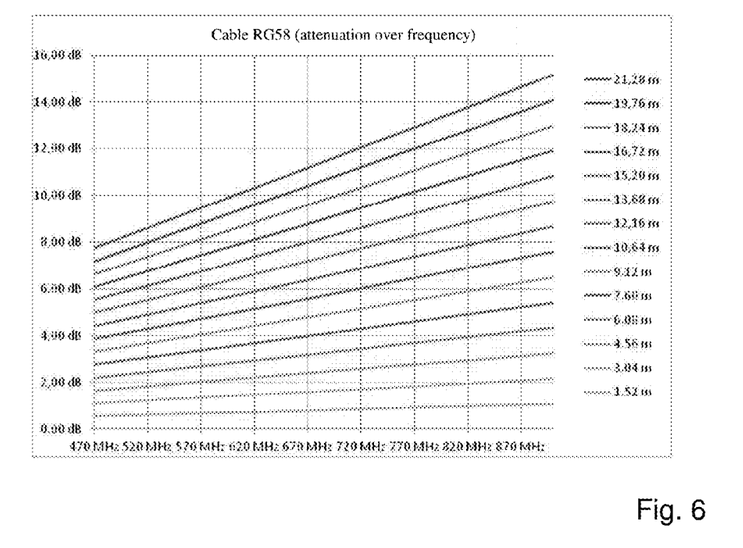
FIG. 6 shows the attenuation of one cable over the frequency for different lengths.

In order to simplify dimensioning of the RF cable 5 or make it unnecessary, in one embodiment of the invention, as shown in FIG. 5, a measurement in comparison can occur using an RF oscillator 9, which lies parallel to the port at 2 and can be connected by means of a switch 12 instead of this in the path and (bushings that match the level) in front of the amplifier 3 and at the output 6 (for example, with an RF level detector, a semiconductor component, which produces a voltage directly proportional to the RF level, which can be measured by µC). The optimal adjustment for the variable attenuation element 4 and the variable slope compensator 7 in its entirety can therefore be found. During an adjustment, the difference between the signals at location 10 and location 11 is minimal.

As follows from this, it is not necessary to know the characteristic of the cable 5 or to establish it and this is also actually not determined, but the compensation conducted directly by means of comparison of the measurements at locations 10 and 11.

Figure 12:
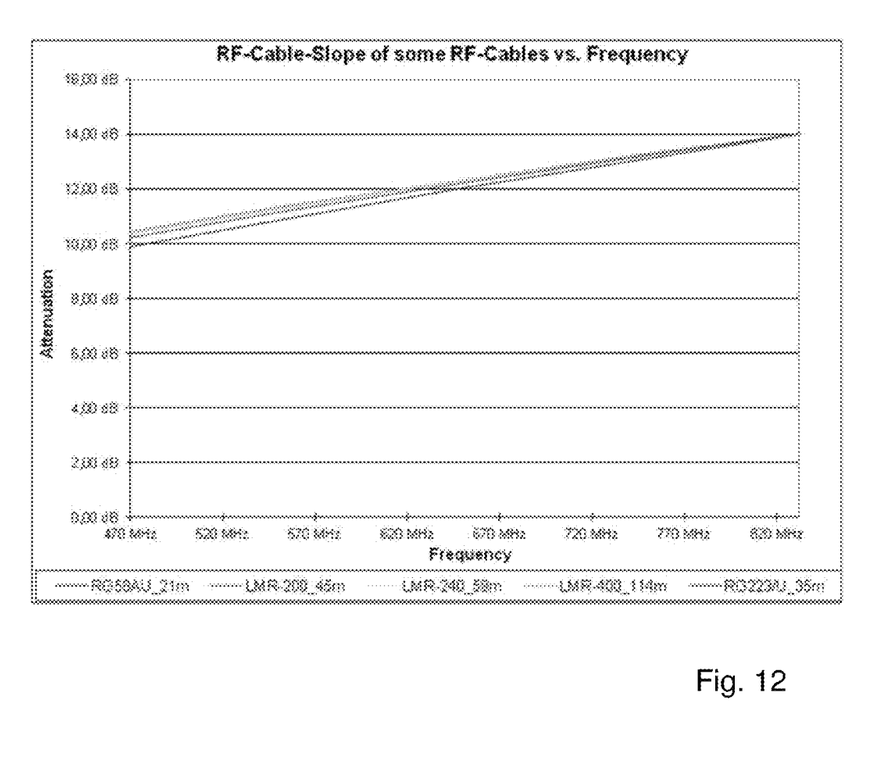
FIG. 12 shows the attenuation of some cables of different types and different lengths over frequency.

FIG. 12 shows as an example the attenuation over frequency for five different cables that are available on the market, in which it is conspicuous that these cables have an almost identical frequency response, despite having a different length. This can be exploited, if one uses only cables that come sufficiently close to this frequency response or another selected frequency response. This creates the possibility of combining the attenuator 4 with the slope compensator 7 in one element. The basis for this is that there is a standard relation between base attenuation and slope by restriction to the selected cable types; the following applies:

Short RF cable: high attenuation and small slope; or

Long RF cable: small attenuation, large slope.

The cables mentioned in the diagram have characteristics lying closely together despite having a different length and this is the result of different qualities of the cables shown as example.

The digital step attenuators available on the market, which are designated in the application as attenuators 4, when integrated in the IC, have several non-variable attenuators, for example, for 1 dB, 2 dB, 4 dB and 8 dB, which are connected in series and permit different total attenuations between 0 and 15 dB in 1 dB steps, depending on whether they are bridged or not.

Figure 7:
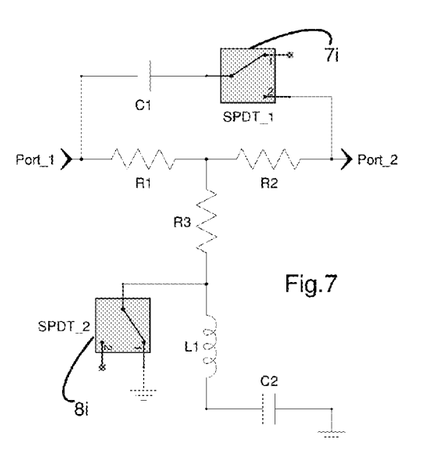
FIGS. 7 and 8 show two switching examples for a simplified solution of the adjustment (i.e., attenuator and slope joined to one element)
Figure 8:
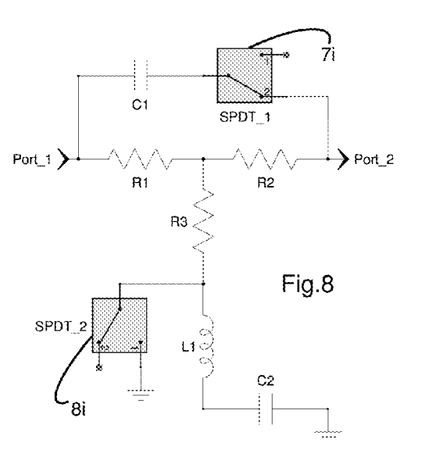

Combining the attenuator 4 and the slope compensator 7 for one of the required attenuation values is shown as an example in FIGS. 7 and 8, in which FIG. 7 shows the attenuation at ON and the slope at OFF, and FIG. 8, in contrast showing the attenuation at OFF and the slope at ON; in other words, the switching states of a slope/attenuator unit are shown simplified here: in FIG. 7 the components that determine the frequency response (i.e., high pass) are deactivated and only defined attenuation is permitted; in FIG. 8 the components that determine frequency response are activated and the effect of the pure attenuator is reduced on this account.

Port 1 and port 2 in these two figures represent the respective connection of the antenna path in series, in which not only L1 and C1, but also C2 must be dimensioned in matching fashion, just like three ohmic resistors R1, R2 and R3. Port 1 and port 2 are required here for the input and output of the 1 dB slope/attenuator element for FIG. 9. For each slope/attenuator (1 dB, 2 dB, 4 dB, 8 dB) a different dimensioning is required. The corresponding resistances essentially determine the attenuation part and the components L_1 dB, C_1 dB determine the slope (according to the relation limited base attenuation→high slope and vice versa). C2, C4, C6 and C8 are also used for determination of the slope.

In practice, the precise values for the components used in the slope compensator 7 can be determined by optimization in simulator. In this case for each switch position of the slope compensator in the corresponding cable they are connected in series in the simulator (in our case 16 series circuits) and everything optimized simultaneously in a constant total attenuation.

For example:
Slope=0 dB+cable=50.4 m→total attenuation=17 dB (highest slope)
Slope=1 dB+cable=46.2 m→total attenuation=17 dB
Slope=15 dB+cable=0 m→total attenuation=17 dB (no slope to be compensated)

Figure 10:
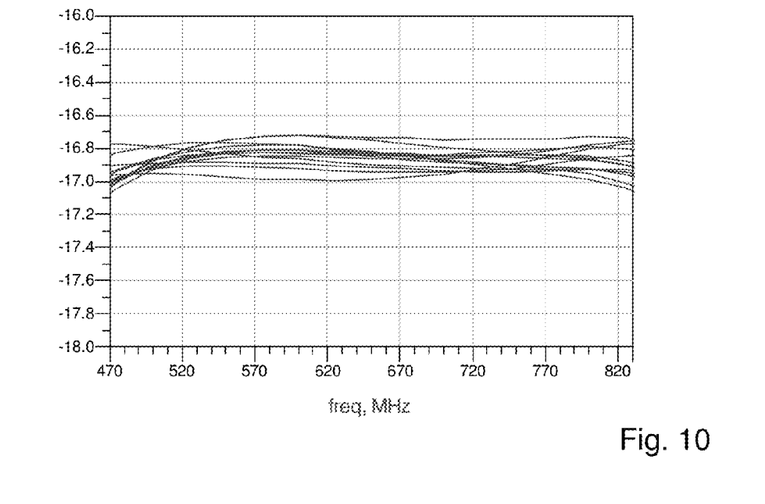
FIG. 10 shows a simulation result of series circuits of different cables with the corresponding attenuator.

FIG. 10 shows the simulation result of the series circuits of different cables with the corresponding attenuator.

Figure 9:
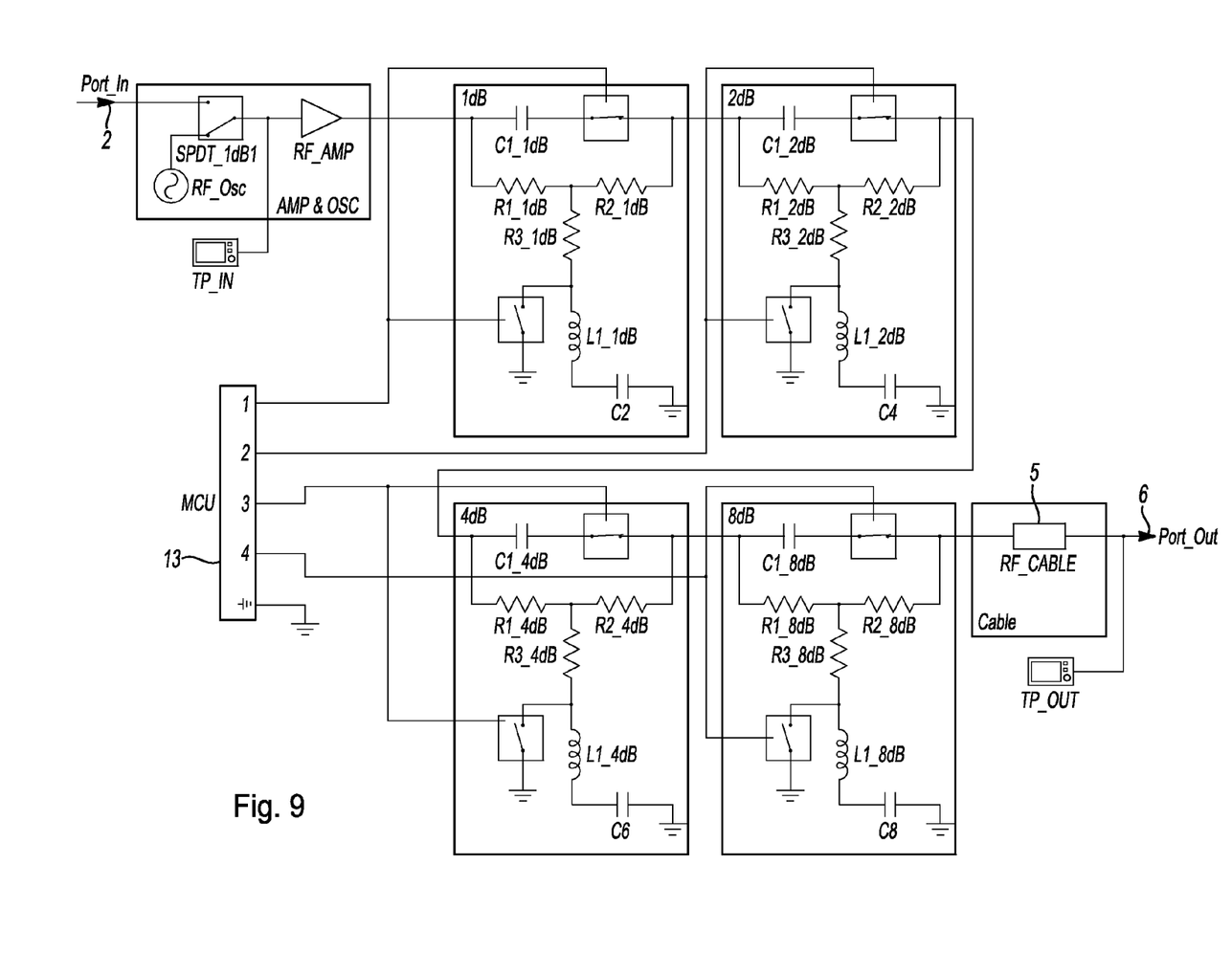
FIG. 9 shows a complete view.

FIG. 9 shows the variant of the invention in which the attenuator and slope are combined. Again there are digitally controllable attenuators with 1 dB, 2 dB, 4 dB, 8 dB, in which the slope is activated by deactivation of attenuation. However, there need not be four such blocks, but more or fewer can be used depending on the desired control range.

FIG. 9 is analogous to FIG. 5 in which where again the connections are provided for dimensioning of the cable 5. In this figure, a microcontroller 13 is also marked with its control lines. The connections for dimensioning are advantageous, since the characteristics of the cable 5 are known in principle, but the lengths are not. Through a rigid connection (with intentionally restricted cable choice) between base attenuation, for example, at 830 MHz and the slope and combining of the attenuator and slope network the required adjustment can be determined at an arbitrary frequency point (in the presence case between 470 MHz and 820 MHz) by means of the oscillator and the two RF level meters described above.

For example:
If one has an amplifier with 17 dB gain, the series circuit of the amplifier, correctly chosen slope attenuator and RF cable 5 (length in 1 dB steps) would always provide a constant frequency response with about 0 dB.

Since, however, it is not known at the outset which adjustment should be chosen for the slope attenuator (cable length unknown), only the values of the two RF level meters need be compared with each other and the slope attenuator varied until the two measured values are the same or the difference forms a minimum.

Through the above described restriction to cable types of specified quality, it is therefore possible to optimally adjust the system with unknown cable length with measurement at any frequency point.

If this restriction does not apply to certain RF cables, one must measure at at least two frequency points and adjust the base attenuation and slope separately from each other.

An antenna system could, for example, include a booster which equals the amplifier+slope attenuator), a cable, a second booster, a second cable and the receiver at the end. The RF level meters depicted in the block diagrams would always sit in front of the amplifiers in the boosters and in the receiver (an oscillator for calibration is only present in the first booster).

One must proceed precisely in this manner in order to bridge larger distances between the antenna and the receiver(s).

Antenna-booster-cable-booster-cable-receiver

The oscillator is naturally only required in the first booster.

The information about which RF levels were measured by the microcontrollers at the corresponding input of the device must be sent over a corresponding connection. The first booster must naturally receive the measurement results of the second booster so that the µC can adjust to the lowest level difference in the former.

For example, the level meter in the first booster measures a voltage of 1 V (=reference oscillator level), then the second booster sends the measured voltage values to the first booster, then the first booster changes the attenuator until the voltage on the second booster is also 1 V. The same process then occurs between the second booster and in our case the receiver. The objective is also to measure 1 V at the receiver input.

For consideration of the slope compensator 7, it should also be explicitly mentioned that the information about the RF level on the second booster must be sent to the first so that the correct attenuation can be adjusted and that subsequently the information concerning the RF level at the receiver input is sent to the second booster for its attenuation element.

Figure 11A:
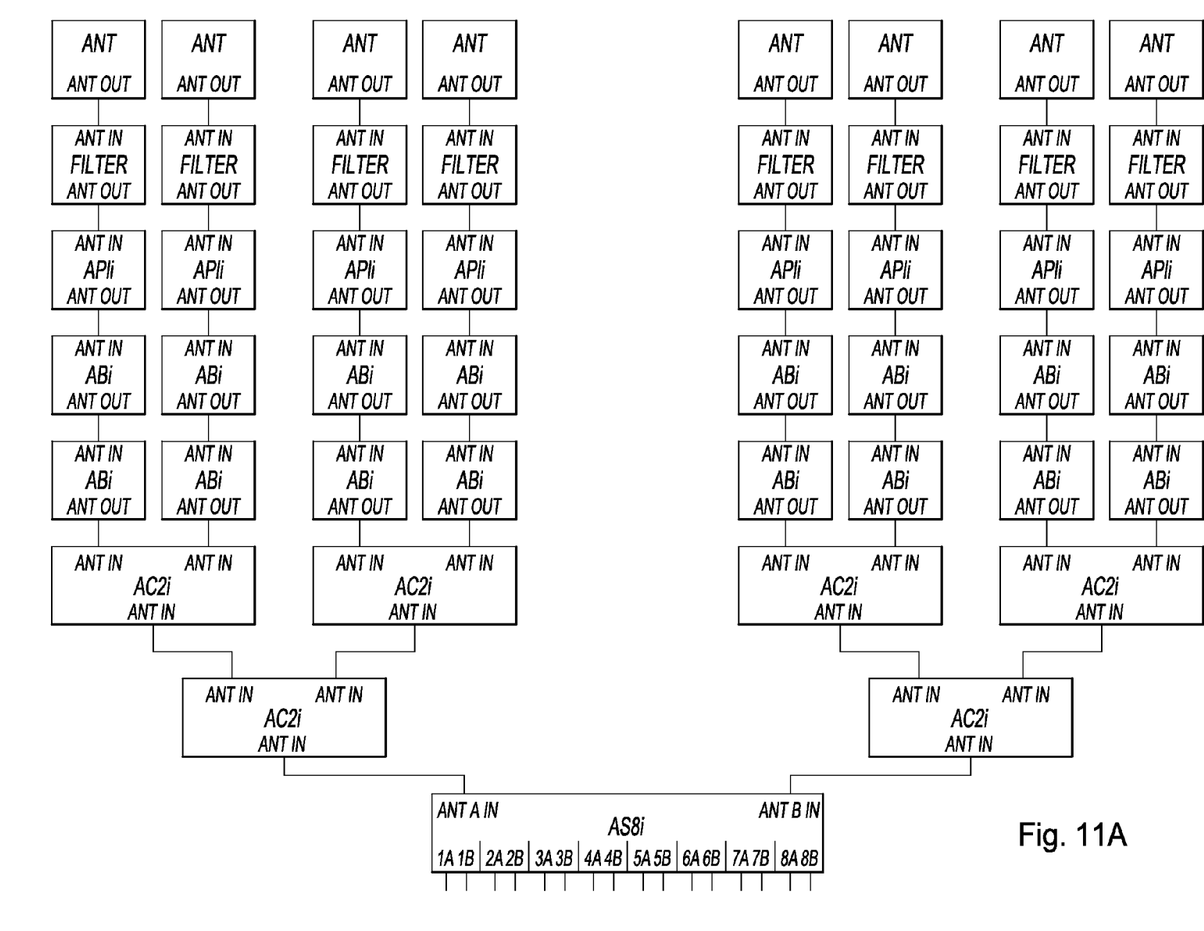
FIGS. 11A-11C show an extensive practical example.
Figure 11B:
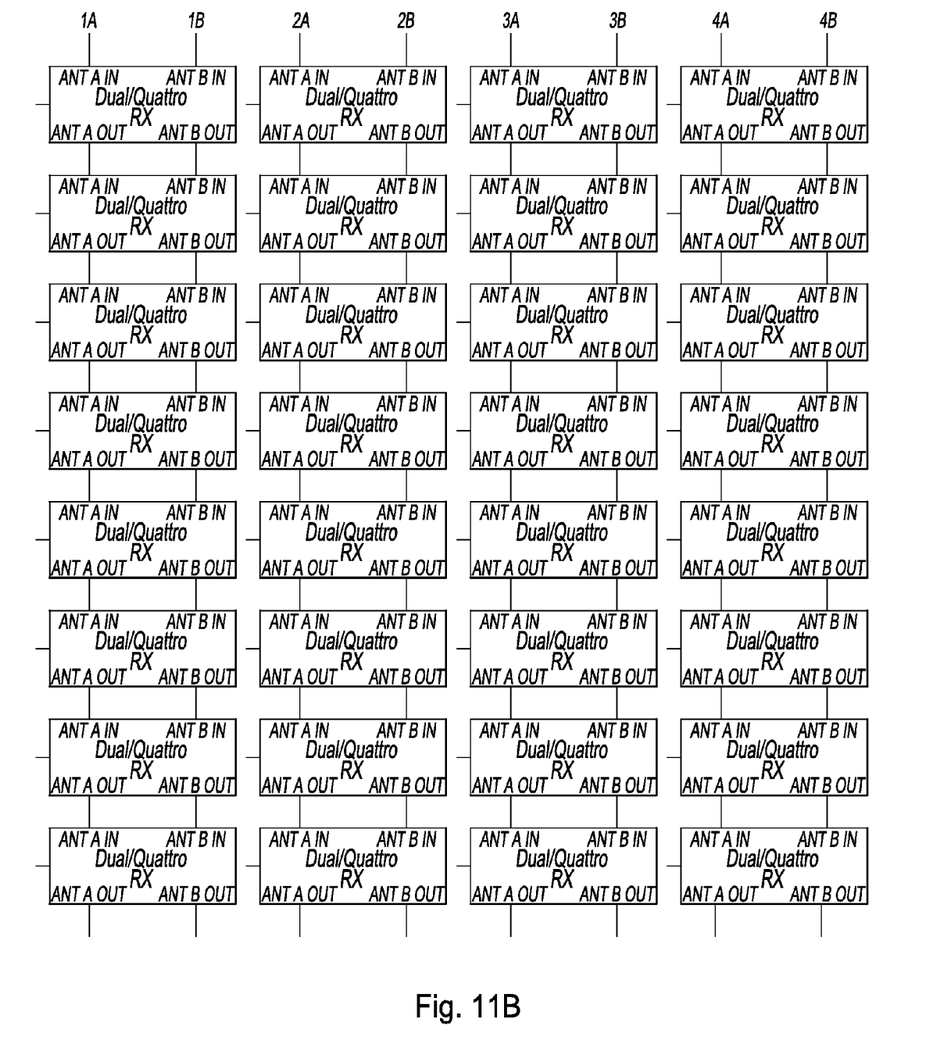
Figure 11C:
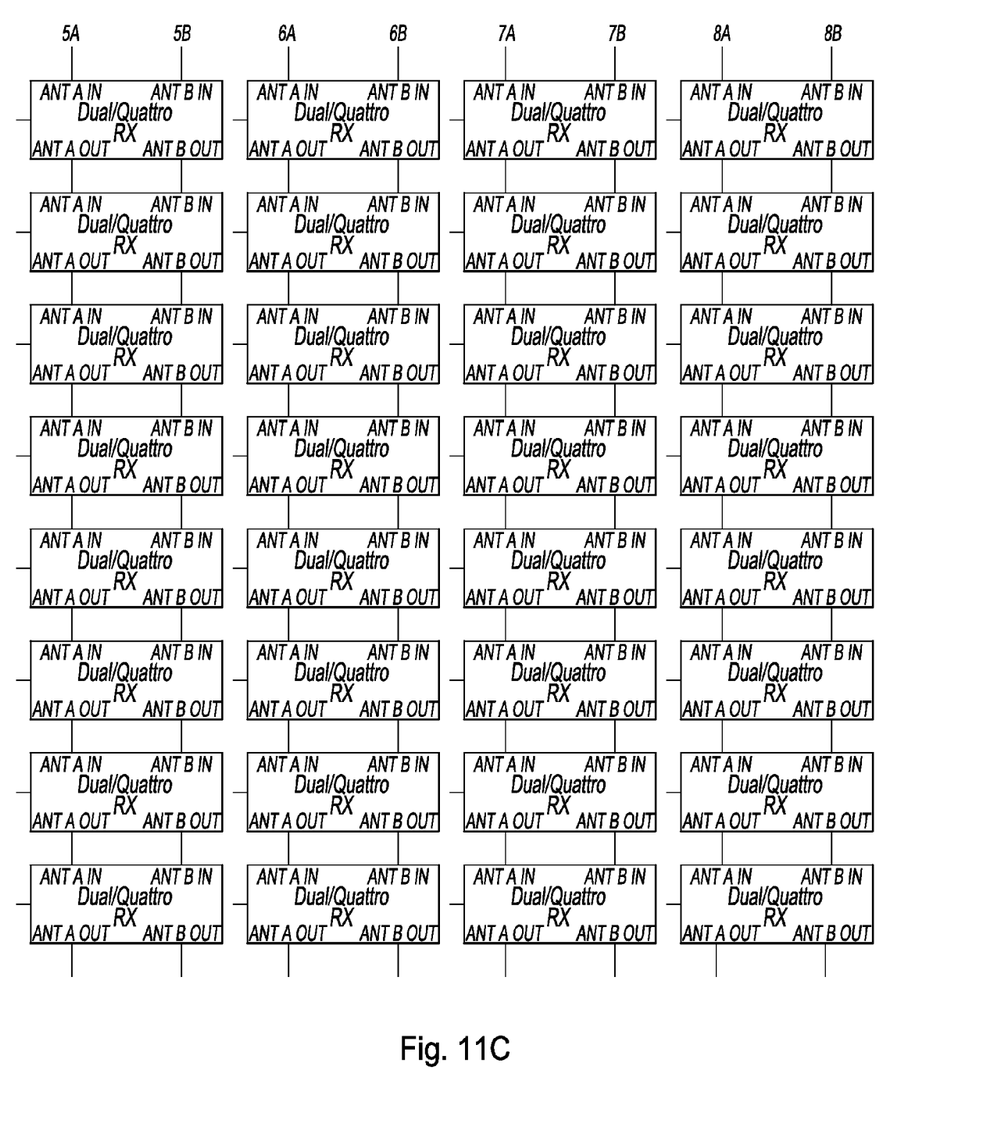

A large antenna system is shown in FIGS. 11A-11C for better understanding. In each antenna element (here called APIi) there is a reference oscillator. Beyond the power splitter (called AS8i) measurement is no longer carried out in this case, since the cables between the power splitter and receiver as well as between the receivers are so short that the slope no longer has any relevance here. This is naturally only one of many examples for an antenna system.

FIG. 12 shows the attenuation of some cables of different types and different lengths over frequency. They have been selected in such a way that, they have an attenuation of 14 dB at 820 MHz. The cables are:
RG58AU=about 21 m
RG223/U=about 35 m
LMR-200=about 45 m
LMR-240=about 59 m
LMR-400=about 114 m As easily can be seen, there is hardly any difference between the cables in respect to the slope (this is the reason why the cables and graphs are not assigned to each other in FIG. 12). Therefore, the user may choose between many cables, as long the attenuation (i.e., as function of the length) at the highest used frequency (e.g. 820 MHz) is not exceeding a given threshold (in the shown example: 14 dB, always depending from the gain of the available amplifier). When using a "shorter" cable (i.e., less attenuation) the compensator according to the invention is used.

If the used cable is short enough to have attenuation at the given (or chosen, depending on the implementation) highest frequency which is 1 dB smaller, the circuit (e.g. FIG. 9) activates the block with the "1 dB" indication only ("1 dB"-block has 1 dB attenuation without slope).

As easily may be seen from FIG. 12, it is of no great importance at what frequency the calibration (see description concerning FIG. 9) is done, as long it is in the interval for which the compensator is designated. In the example of FIG. 12, this interval extends from 470 MHz to 820 MHz.

In any case, the compensator should be "tuned" in a way that the difference between the input signal level and the exit signal level at the chosen frequency is as near to "0" as possible.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An antenna system of a radio microphone comprising:
    an in port;
    an out port being electrically coupled to the in port for defining an antenna path;
    an amplifier being electrically connected to the in port;
    a radio frequency (RF) cable being electrically connected to the out port; and
    an attenuator provided in series with a variable slope compensator that is positioned between the amplifier and the RF cable, and
    wherein the variable slope compensator includes a plurality of resistors that are combined to match the RF cable via corresponding switching elements.

2. The antenna system of claim 1 wherein the plurality of resistors is combined to match the RF cable via the corresponding switching elements by a microcontroller.

3. The antenna system of claim 1 further comprising least one attenuator being combined with the variable slope compensator.

4. The antenna system of claim 1 wherein the attenuator is a controllable attenuator.

5. The antenna system of claim 4 wherein the controllable attenuator creates a difference between the amplifier and a highest attenuation of the RF cable.

6. The antenna system of claim 5 wherein the variable slope compensator compensates for a frequency response of the RF cable.

7. A method for adjusting a setting of slope compensators in an antenna path, the method comprising:
    providing between an in port and an out port of an antenna path, a radio frequency (RF) oscillator, a switch, an amplifier, and slope compensators that include a plurality of resistors;
    connecting, via the switch, the RF oscillator to the plurality of resistors instead of the in port, wherein the RF oscillator is positioned in front of the amplifier and the out port; and
    providing, via an RF level detector that is operably coupled to the out port and that is formed of a semiconductor component, a voltage that is directly proportional to an RF level.

8. The method of claim 7 further comprising, measuring via a microcomputer, the voltage that is directly proportional to the RF level.

9. An antenna system of a radio microphone comprising:
    an in port;
    an out port being electrically coupled to the in port for defining an antenna path;
    an amplifier being electrically connected to the in port; a radio frequency (RF) cable being positioned between the in port and the out port; and
    an attenuator provided in series with a variable slope compensator that is positioned between the amplifier and the RF cable, and
    wherein the variable slope compensator includes a plurality of resistors that are combined to match the RF cable via corresponding switching elements.

10. The antenna system of claim 9 wherein the plurality of resistors is combined to match the RF cable via the corresponding switching elements by a microcontroller.

11. The antenna system of claim 9 further comprising at least one attenuator being combined with the variable slope compensator.

12. The antenna system of claim 9 wherein the attenuator is a controllable attenuator.

13. The antenna system of claim 12 wherein the controllable attenuator creates a difference between the amplifier and a highest attenuation of the RF cable.

14. The antenna system of claim 5 wherein the variable slope compensator compensates for a frequency response of the RF based cable.

* * * * *